Patented Oct. 6, 1953

2,654,739

UNITED STATES PATENT OFFICE 2,654,739

SALTS OF PENICILLIN WITH O-(2-AMINO-ALKYLAMINO)-BENZOIC ACID ESTERS

Harley W. Rhodehamel, Jr., Indianapolis, Ind., assignor to Eli Lilly and Company, Indianapolis, Ind., a corporation of Indiana No Drawing. Application February 13, 1952, Serial No. 271,428

5 Claims. (Cl. 260—239.1)

This invention relates to novel penicillin salts and the preparation thereof.

I have discovered that lower alkyl esters of o-(2-aminoalkylamino)-benzoic acids or salts thereof can be combined with penicillin or its soluble salts by neutralization or metathetical reactions to form sparingly soluble penicillin salts, thereby affording a means of precipitating penicillin from solution, and of purifying penicillin. Moreover, the novel penicillin salts can be utilized therapeutically. A prolonged penicillin blood level can be secured upon administering one of the salts parenterally by methods known to the medical art.

The bases of the salt-forming esters of this invention which react with penicillin to form sparingly soluble salts, are represented by the following formula:

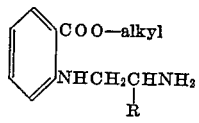

in which R is hydrogen or a lower alkyl group, and alkyl is a lower alkyl group.

The following examples illustrate the preparation of the novel salts of this invention:

Example 1

To a solution of 2 g. of penicillin (e. g. a commercial mixture of the several penicillins) dissolved in 10 ml. of amyl acetate are added 2 g. of methyl o-(2-aminoethylamino)-benzoate dissolved in 5 ml. of amyl acetate. The mixture is cooled and stirred occasionally whereupon the methyl o-(2-aminoethylamino)-benzoate salt of penicillin precipitates. The salt is isolated as by decantation or filtration, and dried in vacuo.

Example 2

To an aqueous solution of 0.3 g. of the potassium salt of penicillin G in 1.8 ml. of water is added a solution of 0.3 g. of ethyl o-(2-amino-1-butylamino)-benzoate hydrochloride in 5 ml. of water. The mixture is cooled and stirred occasionally whereupon the slightly soluble ethyl o-(2-amino-1-butylamino)-benzoate salt of penicillin G precipitates. The salt is separated, and dried in vacuo.

The o-(2-aminoalkylamino)-benzoic acid esters are prepared by the method of the classical Gabriel's synthesis, by reacting a lower alkyl ester of anthranilic acid with the appropriate 2-haloalkyl derivative of phthalimide, hydrolysis of the condensation product, and re-esterification of the carboxyl group of the substituted benzoic acid.

I claim:

1. A salt having as its components penicillin and a base being represented by the formula

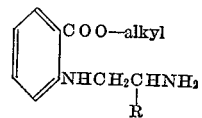

in which R is a member of the group consisting of hydrogen and a lower alkyl radical, and alkyl is a lower alkyl group.

2. The methyl o-(2-aminoethylamino)-benzoate salt of penicillin.

3. The methyl o-(2-aminoethylamino)-benzoate salt of penicillin G.

4. The ethyl o-(2-amino-1-butylamino)-benzoate salt of penicillin.

5. The ethyl o-(2-amino-1-butylamino)-benzoate salt of penicillin G.

HARLEY W. RHODEHAMEL, Jr.

References Cited in the file of this patent

British Report CMR–Br 234 (PB 79,927) Dec. 5, 1947, p. 3.

Westfelt: "Acta Chem. Scand.," vol. 5, No. 2 (1951), p. 327.